May 29, 1956     D. MILLER     2,747,432
HYDRAULIC TRANSMISSIONS
Filed June 14, 1955     2 Sheets-Sheet 1
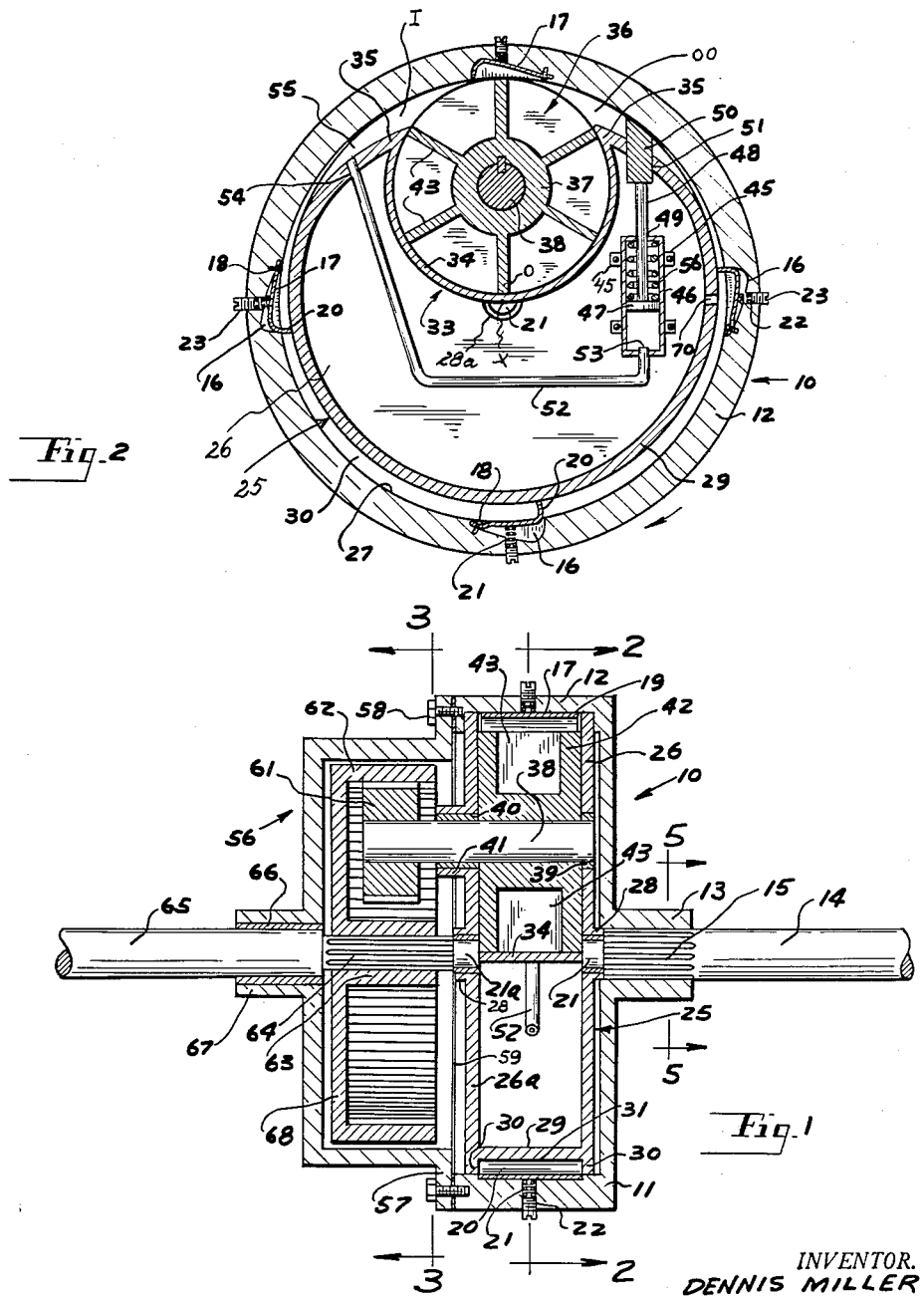
INVENTOR.
DENNIS MILLER
BY
ATTORNEY.

United States Patent Office 2,747,432
Patented May 29, 1956

2,747,432

HYDRAULIC TRANSMISSIONS

Dennis Miller, Detroit, Mich.

Application June 14, 1955, Serial No. 515,340

4 Claims. (Cl. 74—774)

The improvement pertains to a hydraulic power transmission including a driving shaft and a driven shaft, in which transmission the driving member will transmit a rotary movement to the driven member.

The transmission of a type wherein the rotation of the driven shaft is response to the rotation of the driving shaft will be slow in its initial stages, but will increase in speed gradually till both shafts will rotate at the same speed as counted by the number of revolutions per minute.

The object of the improvement is to provide a transmission capable of transmitting power to the driven element gradually and smoothly, without any jerks or tugs.

A further object of the improvement is to provide a transmission of a simple mechanical design but fully practical and efficient.

I shall now describe my improvement with reference to the accompanying drawings in which:

Fig. 1 is a longitudinal sectional view of the transmission in a vertical plane passing through the axis of both the driving element and the driven element;

Fig. 2 is a sectional view on line 2—2 of Fig. 1;

Similar numerals refer to similar parts throughout the several views.

Figure 4:
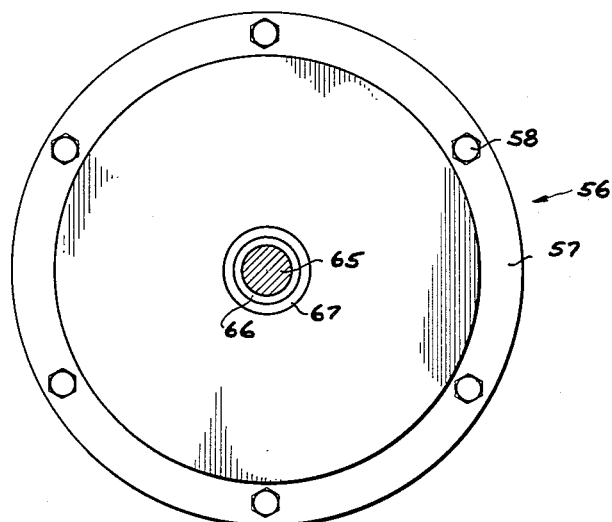
Fig. 4 is an end view of the transmission.
Figure 3:
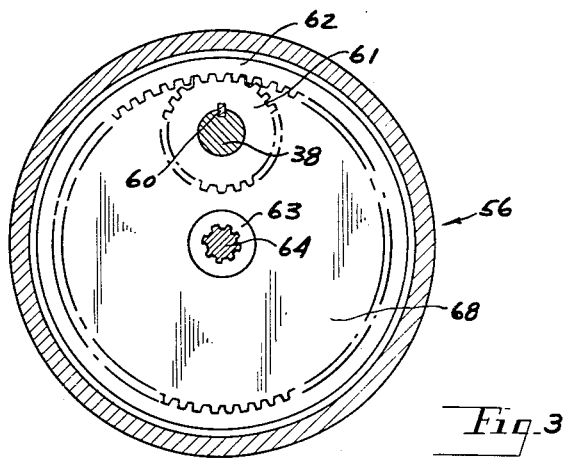
Fig. 3 is a sectional view on line 3—3 of Fig. 1.
Figure 5:
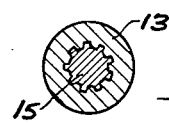
Fig. 5 is a sectional view on line 5—5 of Fig. 1.

The transmission includes a housing consisting of two component parts, one of which, marked 10, has the shape of a drum open at one end, the drum including a flat end wall 11 and a cylindrical wall 12, the end wall being disposed transversely thereto. The flat end wall is provided with a hollow hub 13 for reception of the splined end 15 of a shaft 14 which is adapted to be rotated about its axis by an engine and which, therefore, will be referred to as the engine shaft.

Projecting axially from the splined end 15 of the shaft is a stub 21 to which I shall presently refer.

The cylindrical wall 12 is provided on its inner surface with a plurality of recesses 16, each of which contains a flexible, L-shaped blade 17 which at one end is secured to the wall by a screw 18, while the other end of the blade forms a radially-disposed vane 20.

A spring 21, contained in a radial bore 22 within the wall 12, bears against each blade, urging the vane to project towards the center of the housing 10. A screw 23, threaded into each bore from outside, holds the spring against displacement.

Disposed within the housing 10 and mounted therein on stub axles 21 and 21a is a drum, generally marked 25. The drum includes a substantially cylindrical wall 29 and two side walls 26 and 26a which, at their respective peripheries, are in a sliding contact with the inner surface 27 of wall 12. Each of the walls include a hub portion 28, and each of the hub portions is hollowed to provide a bearing 28a therein for engagement with said stub axles 21 and 21a. One of said stub axles has already been named above. The other, 21a, is an axial extension of the driven shaft which will be described in the course of the specification.

The cylindrical wall 29 is disposed horizontally, but it will be noted that its axis is in an off-center position to the axis of the housing member 10, and it does not describe a full circle but has the form of an arc, an open portion defined by two opposed ends marked 35.

It will be also noted that the diameter of the cylindrical wall 29 is smaller than that of the housing member 10, even though the peripheral portions of the side walls 26 and 26a are in contact with the inner surface of the wall 12, as stated above.

As a result thereof, the outer surface of the wall 29 and the rim portions 30 of the walls 26 and 26a form a trough 31 which is wide enough to receive the full width of the respective vanes 20. The vanes are adapted to bear against said outer surface of the wall 29.

In its upper portion, as shown in Fig. 2, the drum 25 includes a chamber, generally identified by numeral 35. The chamber is defined on its sides by the walls 26 and 26a of the drum and by a transverse wall 34 defining an arc of about 240°, the end portions of the arc being joined to the end portions 35 of the arcuate wall 29 of the drum 25.

Disposed within the chamber is a paddle wheel, generally identified by numeral 36, the wheel including a hub 37 keyed to a shaft 38. The latter is journalled in a bearing 39 in wall 26 and in a bearing 40 located in a boss 41 on wall 26a. The wheel includes two disk-shaped side members 42 and a member of paddles 43 disposed radially with respect of the shaft 38.

It will be noted that the outer ends of the paddles are in a sliding contact with the inner surface of the wall 34 and with the inner surface of the wall 12 of the casing member 10 along the area between the ends 35 of the arcuate wall 29.

Located within the interior of the drum 25, and secured therein by brackets 45, is a cylinder 46. A piston 47 disposed within the cylinder, and extending from the piston through one end of the cylinder, as shown at 49, is a rod 48.

At its outer end the rod carries a plug 50. The plug is adapted to slide outwardly from the drum through an aperture 51 in the wall 28 of said drum. Secured to the other end of the cylinder, as shown at 53, is a tube 52, while the other end of the tube leads to an aperture 54 in said wall 28 and opens into a free space 55 leading into the chamber 33. A coil spring 56 within said cylinder 46 urges the piston in the direction of that end of the cylinder which is connected to said tube 52.

A complementary part of the housing of the transmission is generally marked 56. This part of the housing has also the form of a drum open at one end, but is provided at said end with an outwardly-turned flange 57. The flange contains a number of holes spaced from each other and serving for reception of screws 58 which are adapted to be threaded into holes in the rim of wall 12 of the first-named member 10 of said housing, in order that both said parts of the housing may be held together. In order to make the connection liquid tight, a gasket 59 is employed between the flange 59 and the rim portion of said wall 12, as shown in Fig. 1.

Mounted upon shaft 38 at that portion thereof which projects into the housing 58, and keyed to said shaft by means of a key 60, is a pinion 61. The latter is meshed with a gear wheel 62. The hub portion 63 of said last-named gear wheel is mounted upon a shaft 64 for rotation therewith. The shaft is but an axial extension of the driven shaft 65 which is of a larger diameter and which is journalled for rotation in a bearing 66 in the hub 67 of said component member 56 of the casing of the transmission.

At this point I wish to add that the interior of the drum 25 is filled with a liquid such as oil, and that the wall 29 contains an opening 70 through which the oil may pass outwardly into the space between said wall 29 and the wall 12 of the casing 10.

The mechanism operates as follows:

Once the engine shaft begins to rotate about its axis, the whole casing, including members 10 and 56, will rotate therewith. Assuming that the casing will rotate in a clock-wise direction, each of the vanes 20 being in contact with the outer surface of drum 25, will push a quantity of oil confined within the space between the wall 29, the wall 12, and the peripheral portions 30 of side walls 26 and 26a, till said oil will have entered the chamber 33. The pressure of oil against the respective paddles in the chamber will impart a rotary movement to the paddle wheel, including its shaft 38. The oil, brought by the vanes into the chamber, will fill the pockets between the respective paddles, and in the course of the rotation of the paddle wheel will be spilled into a free space at the other side of the opening of the chamber. From then on, the oil will be propelled again by vanes 20 about the circumference of the drum 25.

As the paddle wheel is made to rotate, the pinion 61 mounted on the shaft will impart a rotary movement to the gear wheel 62 and through said wheel to the driven shaft 65. To put it in other words, the initial rotation of the engine shaft 14 will bring about the rotation of the driven shaft 65 by means of the fluid driven paddle wheel 36.

Because of the initial inertia of the paddle wheel, its rotation in the beginning will be slow, so that relatively only a small quantity of oil will be conveyed by the paddles from the chamber outwardly to the outlet side "OO" of the opening of said chamber. Gradually, as the paddle wheel will pick up speed, a larger volume of oil will be delivered into the chamber so that the oil in the space approaching the chamber, that is, on the intake side "I" of the chamber, will be built up. As the pipe 52 opens at one end into said space "I," the oil passing through said pipe into the cylinder 46 will move the piston 47 outwardly, pushing the plug 50 against the inner surface of the wall 12 of the housing member 10.

This will stop the flow of oil from the chamber, the flow of oil into the chamber, the rotation of the paddle wheel, and the rotation of the gear wheel 62. As a further result thereof, the driven shaft 65 will rotate with the housing, that is, at the same speed as the driving shaft 14.

However, once the engine has been slowed down or stopped, said spring 56 in the cylinder 46 will return the piston to its initial position, the oil from the cylinder will be squeezed out, and the plug connected to the piston will be withdrawn from contact with the inner surface of wall 12. As a result, the transmission will be in a condition for a repetition of the functions described above.

After having described my invention, what I wish to claim is as follows:

1. A hydraulic transmission comprising a housing having a cylindrical wall and two end walls, a driving shaft axially secured to one end wall, a driven shaft axially journalled in the other end wall, a drum mounted within the housing for a rotary movement with relation to said housing, the drum having a cylindrical wall and two end walls, a chamber within the drum, said chamber being, in part, defined by an arcuate wall opening towards the circular wall of the housing, a paddle wheel mounted within the chamber for rotation with relation to said drum, a liquid medium between the circular wall of the drum and the circular wall of the housing, vane means projecting radially from the circular wall of the housing towards the circular wall of the drum, the vanes being adapted to propel said liquid medium along the periphery of the drum towards the paddle wheel to impart a rotary movement thereto, the paddle wheel including an axial shaft having one end projecting outwardly of the drum, a pinion axially mounted upon said end of the shaft, and a gear wheel in mesh with the pinion, the gear wheel being axially mounted upon the driven shaft and adapted to impart a rotary movement thereto.

2. A hydraulic transmission comprising a housing having a cylindrical wall and two solid end walls, a driving shaft axially secured to one end wall, a driven shaft journalled within the other end wall, a drum mounted for rotation within the housing and including two side walls having peripheral portions in a sliding contact with the inner surface of the cylindrical wall of the housing, said drum having a peripheral trough defined by the marginal portions of said side walls and by the cylindrical wall of the drum, a chamber within the drum, the chamber being defined by an arcuate wall open towards said trough, a paddle wheel within the chamber, the wheel including an axial shaft journalled within the side walls of the drum, the shaft including a portion extending outwardly of the drum, a pinion axially keyed to said portion of the shaft, a gear wheel disposed within the housing in a parallel relation to the drum and axially mounted upon the driven shaft, the gear wheel being in mesh with said pinion and adapted to be driven thereby, a liquid medium filling the trough, and a plurality of vanes radially projecting from the inner surface of the cylindrical wall of the housing into said trough and adapted to propel the liquid medium within the trough against the paddle wheel to impart a rotary movement thereto.

3. A hydraulic transmission comprising a housing having a cylindrical wall and two solid end walls, a driving shaft axially secured to one end wall, a driven shaft journalled within the other end wall, a drum mounted for rotation within the housing and including two side walls having peripheral portions in a sliding contact with the inner surface of the cylindrical wall of the housing, said drum having a peripheral trough defined by the marginal portions of said side walls and by the cylindrical wall of the drum, a chamber within the drum, the chamber being defined by portions of the walls of the drum and an arcuate wall therebetween, the arcuate wall having an opening towards the wall of the casing, a portion of the opening at one end of the arc being the intake portion of the chamber, a paddle wheel within the chamber, the wheel including an axial shaft journalled within the side walls of the drum, one end portion of the shaft extending outwardly of the drum, a pinion axially keyed to said portion of the shaft, a gear wheel keyed to the driven shaft and in mesh with said pinion, a fluid medium within the trough and the chamber, a plurality of vanes radially projecting from the inner surface of the housing and adapted to propel the fluid medium towards the paddle wheel, a stationary cylinder within the drum, a piston within the cylinder, a rod extending through one end of the cylinder and adapted to be moved into the trough, a blocking member mounted upon the end of the rod and adapted to be moved outwardly of the drum into the trough, spring means to keep the blocking member in a normally retracted position from said trough, and a pipe leading from a point adjoining the chamber to the opposite end of said cylinder to convey the fluid medium to the cylinder, the piston being responsive to the increased pressure of the medium at the intake portion of the chamber to move the block into the trough to prevent movement of the medium therethrough to the chamber.

4. A hydraulic transmission comprising a housing having a cylindrical wall and two end walls, a driving shaft axially secured to one end wall, a driven shaft axially journalled in the other end wall, a drum mounted for rotation within the casing in a substantially axial alinement therewith, the drum including two circular walls in a parallel arrangement and a transverse wall therebetween, said last-named wall defining an arc of more than 180° and being provided with a trough facing the cylindrical wall of the casing, a chamber within the drum, the chamber being defined on the sides by portions of the parallel walls of the drum and by a transverse wall defining an arc the ends of which are joined to the transverse wall of the drum, a paddle wheel mounted for rotation within the chamber and including a shaft journalled within the side walls of the drum, one end of the last-named shaft projecting outwardly of the drum in a direction away from the end wall of the casing which is affixed to the driving shaft, a pinion axially keyed to said end of the shaft of the paddle wheel, gear means in mesh therewith to impart a rotary movement to the driven shaft, a fluid medium within the trough and within the chamber, a plurality of vanes projecting from the inner surface of the cylindrical wall of the casing into the trough to propel the liquid medium towards the paddle wheel, a radially-disposed member within the drum but adapted to slide out therefrom towards the trough, spring means to keep said member normally out of said trough, and means responsive to the pressure of the fluid medium within the portion of the trough leading into said chamber to move the member into the trough to stop movement of the fluid medium through said trough.

References Cited in the file of this patent

UNITED STATES PATENTS

| | | |
|---|---|---|
| 1,507,369 | Escott | Sept. 2, 1924 |
| 2,133,276 | Ballantyne | Oct. 18, 1938 |

FOREIGN PATENTS

| | | |
|---|---|---|
| 386,540 | Germany | Dec. 11, 1923 |